United States Patent
Stevens et al.

(10) Patent No.: US 12,027,693 B2
(45) Date of Patent: Jul. 2, 2024

(54) METHOD FOR PRODUCTION BY AQUEOUS ROUTE OF A ZINC ELECTRODE

(71) Applicant: ELECTRICITE DE FRANCE, Paris (FR)

(72) Inventors: Philippe Stevens, Noisy Rudignon (FR); Gwénaëlle Toussaint, Nemours (FR)

(73) Assignee: ELECTRICITE DE FRANCE, Paris (FR)

( * ) Notice: Subject to any disclaimer, the term of this patent is extended or adjusted under 35 U.S.C. 154(b) by 165 days.

(21) Appl. No.: 16/722,858

(22) Filed: Dec. 20, 2019

(65) Prior Publication Data

US 2020/0203716 A1 Jun. 25, 2020

(30) Foreign Application Priority Data

Dec. 21, 2018 (FR) ..................................... 18 73832

(51) Int. Cl.
  *H01M 4/24* (2006.01)
  *H01M 4/02* (2006.01)
  *H01M 4/04* (2006.01)
  *H01M 4/62* (2006.01)
  *H01M 10/36* (2010.01)

(52) U.S. Cl.
  CPC ........... *H01M 4/244* (2013.01); *H01M 4/043* (2013.01); *H01M 4/623* (2013.01); *H01M 10/36* (2013.01); *H01M 2004/027* (2013.01)

(58) Field of Classification Search
  CPC .... H01M 4/244; H01M 4/623; H01M 4/0497; H01M 4/1395; H01M 2004/027
  See application file for complete search history.

(56) References Cited

U.S. PATENT DOCUMENTS

| | | | |
|---|---|---|---|
| 7,300,721 B2 | 11/2007 | Bugnet et al. | |
| 10,472,248 B2 | 11/2019 | Lacoste et al. | |
| 2004/0166412 A1 | 8/2004 | Bugnet et al. | |
| 2014/0205909 A1* | 7/2014 | Yonehara | H01M 10/24 429/302 |
| 2018/0086646 A1* | 3/2018 | Lacoste | H01M 4/26 |

FOREIGN PATENT DOCUMENTS

| | | | |
|---|---|---|---|
| CN | 1397498 A | * | 2/2003 |
| CN | 1482698 A | * | 3/2004 |
| FR | 2 828 336 | | 2/2003 |

(Continued)

OTHER PUBLICATIONS

Wang, Shengwei, Zhanhong Yang, and Lihui Zeng. "Study of calcium zincate synthesized by solid-phase synthesis method without strong alkali." Materials Chemistry and Physics 112.2 (2008): 603-606. (Year: 2008).*

(Continued)

*Primary Examiner* — Matthew T Martin
*Assistant Examiner* — Grace Ann Kenlaw
(74) *Attorney, Agent, or Firm* — NIXON & VANDERHYE

(57) ABSTRACT

Disclosed is a production method for a zinc electrode with in situ formation of calcium zincate crystals. The method includes notably the steps of preparation of a mixture, growth of crystals, slowing of the growth and production of the electrode.

13 Claims, 1 Drawing Sheet

(56) References Cited

FOREIGN PATENT DOCUMENTS

FR        3 034 412      10/2016
WO    WO 2000/036677     6/2000

OTHER PUBLICATIONS

Sharma, Ram A. "Kinetics of calcium zincate formation." Journal of the Electrochemical Society 135.8 (1988): 1875. (Year: 1988).*
French Search Report, FR 1873832, dated Nov. 4, 2019.
Lee, Chang Woo et al., "Effect of additives on the electrochemical behaviour of zinc anodes for zinc/air fuel cells," Journal of Power Sources 160 (2006) 161-164.
Lee, Chang Woo et al., "Novel electrochemical behavior of zinc anodes in zinc/air batteries in the presence of additives," Journal of Power Sources 159 (2006) 1474-1477.
Lewis, Harlan L. et al., "Alternative separation evaluations in model rechargeable silver-zinc cells, " Journal of Power Sources 80 (1999) 61-65.
Dewi, Eniya Listiani et al., "Cationic polysulfonium membrane as separator in zinc-air cell," Journal of Power Sources 115 (2003) 149-152.
Neburchilov, Vladimir et al., "A review of air cathodes for zinc-air fuel cells," Journal of Power Sources 195 (2010) 1271-1291.
Parker, Joseph F. et al., "Rechargeable nickel-3D zinc batteries: An energy-dense, safer alternative to lithium-ion," Science 356, 415-418 (2017).

* cited by examiner

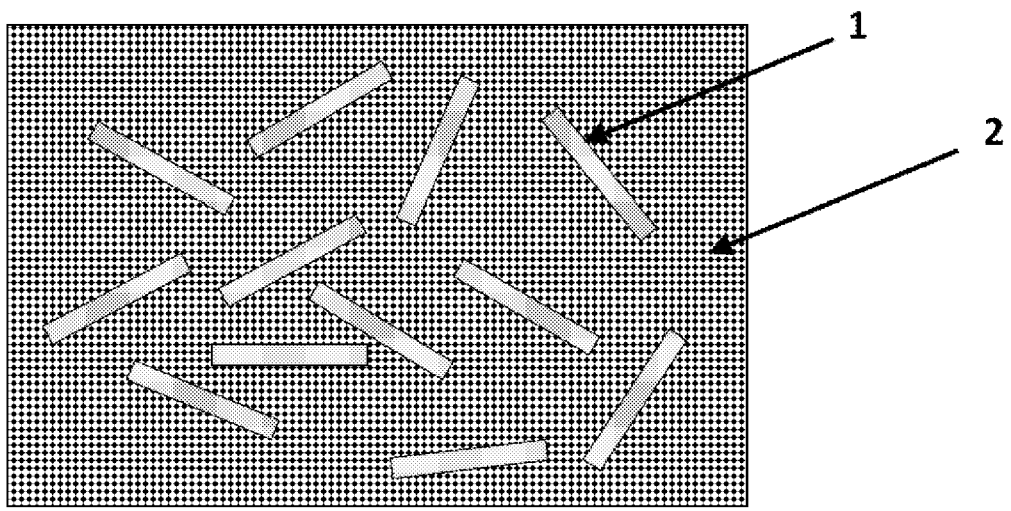

METHOD FOR PRODUCTION BY AQUEOUS ROUTE OF A ZINC ELECTRODE

TECHNICAL FIELD

The invention comes from the field of electrochemical batteries and more specifically a method for production of a specific zinc electrode.

Prior Art

Negative electrodes of metallic zinc are particularly attractive for batteries because they have a high capacity per weight (820 Ah/kg of zinc), can undergo charge and discharge cycles in aqueous electrolyte and are produced from a raw material that is abundant, non-toxic and low cost.

Zinc electrodes are used in several types of batteries that use an alkaline electrode. For example, the zinc electrodes can be used in zinc-manganese dioxide batteries (commonly called "alkaline batteries") or zinc-air batteries (used for example in hearing aids). These two examples of batteries are not designed to be recharged and their zinc-based negative electrode operates by electrochemical transformation of metallic zinc into zinc oxide (according to the reaction from equation 1) or to zincate $[Zn(OH)_4]^{2-}$ in solution (according to the reaction from equation 2).

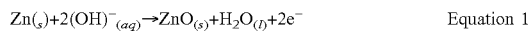

$$Zn_{(s)} + 2(OH)^-_{(aq)} \rightarrow ZnO_{(s)} + H_2O_{(l)} + 2e^- \quad \text{Equation 1}$$

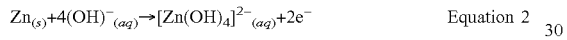

$$Zn_{(s)} + 4(OH)^-_{(aq)} \rightarrow [Zn(OH)_4]^{2-}_{(aq)} + 2e^- \quad \text{Equation 2}$$

The zinc electrodes are also used as negative electrodes in several types of rechargeable batteries using an alkaline electrolyte, for example nickel-zinc, silver-zinc or zinc-air batteries. To increase the number of charge-discharge cycles for these batteries, it is then preferable that the zinc electrode be primarily made of zinc oxide (ZnO), which could be in a mixture with metallic zinc (Zn). In fact, in these examples of rechargeable batteries, the reactions given by equations 1 and 2 must be able to operate in the reverse direction as well, according to the reactions from equations 3 and 4.

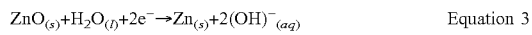

$$ZnO_{(s)} + H_2O_{(l)} + 2e^- \rightarrow Zn_{(s)} + 2(OH)^-_{(aq)} \quad \text{Equation 3}$$

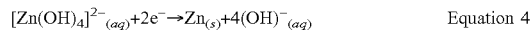

$$[Zn(OH)_4]^{2-}_{(aq)} + 2e^- \rightarrow Zn_{(s)} + 4(OH)^-_{(aq)} \quad \text{Equation 4}$$

During the discharge of such a battery, oxygen is reduced at the positive electrode and the metal is oxidized at the negative electrode.

Discharge at the negative electrode: $M \rightarrow M^{n+} + n\ e^-$

Discharge at the positive electrode: $O_2 + 2H_2O + 4e^- \rightarrow 4\ OH^-$

When a metal-air battery must be electrically recharged, the direction of the current is reversed. Oxygen is produced at the positive electrode and the metal is redeposited by reduction at the negative electrode:

Recharge at the negative electrode: $M^{n+} + n\ e^- \rightarrow M$

Recharge at the positive electrode: $4\ OH^- \rightarrow O_2 + 2H_2O + 4e^-$

The advantage of zinc-air systems resides in the use of an infinite capacity positive electrode. Zinc-air type electrochemical generators are therefore known for their high energy density, which can reach several hundreds of Wh/kg. Oxygen consumed at the positive electrode does not need to be stored in the electrode and can be taken from the environmental air.

During recharging, the metallic ions $Zn^{2+}$ are reduced at the negative electrode and deposit in their metal form Zn once the potential near this electrode is sufficiently negative.

A uniform and homogeneous deposit of the metal on the electrode is preferred to provide a good hold during charge and discharge cycles of this electrode.

However, it has been observed that, under some conditions, the metal would deposit as a foam that adhered poorly to the surface of the electrode; the foam would next detach from the electrode causing a loss of active material and consequently a loss of capacity of the battery. In other cases, it was observed that the metal could also deposit in dendritic form. These dendrites could then grow until reaching the positive electrode during charging, causing an internal short-circuit blocking recharging.

To try to resolve these problems and produce a homogeneous zinc deposit during recharging, some solutions were already proposed:

- the Lawrence Berkeley Laboratory (LBL) and MATSI Inc. sought to increase the porosity in the electrode in order to reduce the surface current densities responsible, when they are high, for the formation of the dendrites. Up to a certain point, the growth of dendrites towards the outside of the electrode can be limited by the use of a porous zinc electrode, because the zinc growth during charging occurs inside the electrode. For example, Joseph F. Parker et al. ("*Rechargeable nickel-3D zinc batteries: An energy-dense, safer alternative to lithium-ion*", Science 28 April 2017: Vol. 356, Issue 6336, pp. 415-418; DOI: 10.1126/science.aak9991) describes a zinc electrode made in the charged state in the form of a sponge. However, this electrode must not be discharged more than 40% of the theoretical capacity of zinc in the electrode and loses 20% of the usable capacity thereof after 80 charge/discharge cycles.

- placing a separator on the electrode was proposed (see for example H. L. Lewis et al., "Alternative separation evaluations in model rechargeable silver-zinc cells", *Journal of Power Sources* 80 (1999) 61-65, and E. L. Dewi et al., "Cationic polysulfoninun membrane as separator in zinc-air cell", *Journal of Power Sources* 115 (2003) 149-152),

- the addition of additives to the electrolyte has also been considered (see for example C. W. Lee et al., "Effect of additives on the electrochemical behaviour of zinc anodes for zinc/air fuel cells", *Journal of Power Sources* 160 (2006) 161-164, and C. W. Lee et al., "Novel electrochemical behavior of zinc anodes in zinc/air batteries in the presence of additives", *Journal of Power Sources* 159 (2006) 1474-1477),

- the addition of additives in the zinc electrode was also described. The patent EP 1,024,545 proposes, for example, adding an electronic conductor not participating in the electrochemical reaction. This electronic conductor, such as titanium nitride, is added in powder form. It contributes to getting a more homogeneous and non-dendritic deposit of metal zinc during charging.

The patent application US 2018/0086646 proposes using calcium zincate in the zinc electrode. During the charging phase, the zincate ions $Zn(OH)_4$ present in solution in the electrolyte are reduced into metallic zinc (equation 4), reducing the concentration of zincate ions in solution, in particular immediately by the metallic zinc redeposited on the electrode. This localized reduction of the zincate ion concentration supports the growth of metallic zinc in dendritic form. The addition of calcium zincate crystals $Ca(OH)_2 \cdot 2Zn(OH)_2 \cdot 2H_2O$ to the zinc electrode aims to locally increase the zincate ion concentration. In the application US 2018/0086646, the calcium zincate is obtained from a zinc oxide (ZnO), calcium hydroxide ($Ca(OH)_2$) and water mixture in stoichiometric proportion in a large quantity of water by means of a high energy horizontal mixer containing zirconium microbeads. The solution proposed in that application however requires specific tooling which makes the electrode production method complex. Further, the calcium zincate isn't always uniformly distributed within the electrode which does not serve to limit dendrite formation sufficiently effectively.

Technical Problem

A need remains for new zinc electrodes not causing the formation of a metallic zinc deposit harmful to proper operation of the battery, in particular foam or dendritic form deposits.

Such an electrode must also serve to increase the number of electrical charge and discharge cycles of the zinc-air battery, and thus advantageously give the battery a longer life.

Brief Description of the Invention

It is to the Applicant's credit that it observed that by optimizing the distribution and size of the calcium zincate crystals on the zinc electrode, it is possible to limit the formation of zinc deposits in foam or dendritic form.

The present invention proposes a novel production method for a zinc electrode which allows in situ formation of controlled size calcium zincate crystals within the zinc electrode where said crystals are distributed particularly homogeneously throughout the structure of the electrode.

BRIEF DESCRIPTION OF THE DRAWINGS

FIG. 1

FIG. 1 shows an illustration of the calcium zincate crystals $Ca(OH)_2.2Zn(OH)_2.2H_2O$ (1) formed during step b according to the method of the present invention. Said crystals are formed in situ in the mixture of zinc oxide (ZnO), calcium hydroxide ($Ca(OH)_2$) and water ($H_2O$)(2).

DISCLOSURE OF THE INVENTION

The object of the present invention is a zinc electrode production method comprising at least the following steps:
a) preparation of a mixture of zinc oxide (ZnO) and/or one of the precursors thereof, calcium hydroxide ($Ca(OH)_2$) and water ($H_2O$), where the molar ratio (ZnO/Ca($OH)_2$) is included between 2/1 and 10/1, preferably 3/1 and 6/1
b) ripening of the mixture prepared in step a), so as to form calcium zincate crystals $Ca(OH)_2.2Zn(OH)_2.2H_2O$ according to the reaction from equation 5

$$2ZnO + Ca(OH)_2 + 4H_2O \rightarrow Ca(OH)_2.2Zn(OH)_2.2H_2O, \quad \text{Equation 5}$$

c) addition of solvent to the mixture coming from step b) so as to interrupt the ripening by slowing the growth of the calcium zincate crystals $Ca(OH)_2.2Zn(OH)_2.2H_2O$, and
d) production of a zinc electrode by means of the mixture comprising calcium zincate crystals $Ca(OH)_2.2Zn(OH)_2.2H_2O$ from step c.

The presence of calcium zincate crystals $Ca(OH)_2.2Zn(OH)_2.2H_2O$ uniformly distributed in the electrode structure itself has the effect of acting as a reservoir with which to provide zincate ions near the electrode during the reduction phase by decomposition according to the reaction from equation 6.

$$Ca(OH)_2.2Zn(OH)_2.2H_2O + 4OH^- \rightarrow 2[Zn(OH)_4]^{2-} + Ca(OH)_2 \quad \text{Equation 6}$$

In the context of the invention, the zinc electrode made by means of the previously described method is mostly made up of zinc oxide ZnO, which could be mixed with metallic zinc. It is produced in the discharged state and requires a first so-called "training" charge to precipitate the zinc in metal form (active material for the oxidation-reduction reaction).

During the first charging phase (training charge), several reactions allowing the formation of metallic zinc take place:
the reaction transforming zincate ions into metallic zinc, according to equation 4, previously described, which has the fastest kinetics;
the reaction of zinc oxide dissolving in zincate ions according to equation 7 described below, which has slower kinetics; and
the reaction transforming calcium zincate crystals into zincate ions according to equations 6 previously described.

$$ZnO_{(s)} + 2OH^-_{(aq)} + H_2O \rightarrow [Zn(OH)_4]^{2-}(aq)$$

It is to the Applicant's credit that it observed that the size of the calcium zincate crystals would allow controlling the kinetics of their transformation into zincate ions during reduction (charging phase). By controlling the size of the calcium zincate crystals, it is thus possible to assure that the transformation thereof into zincate ions proceeds more quickly than the dissolution of zinc oxide, but more slowly than the transformation of zincate ions from the electrolyte into metallic zinc. In other words, the size of the calcium zincate crystals is controlled such that the kinetics of their transformation into zincate ions is located between that of dissolution of zinc oxide and that of transformation of zincate ions from the electrolyte into metallic zinc. The calcium zincate crystals thus serve to compensate for the localized reduction of zincate ions near the metallic zinc precipitated on the electrode, in that way preventing dendrite formation. The Applicant also developed a production method for a zinc electrode comprising calcium zincate crystals with controlled size and homogeneous distribution in order to control the kinetics of their transformation into zincate ions.

Another object of the present invention, according to another aspect, is a zinc electrode which could be obtained from such a method.

Another object of the invention, according to a third aspect, is a zinc-air battery using at least one zinc electrode as previously described as negative electrode.

Step A

The method according to the invention therefore implements a first step of preparation of a mixture of zinc oxide (ZnO) and/or one of the precursors thereof, calcium hydroxide ($Ca(OH)_2$) and water ($H_2O$).

The zinc oxide (ZnO) precursor can, for example, be chosen among zinc peroxide ($ZnO_2$) or a zinc hydroxide, such as $Zn(OH)_2$.

Preferably, the first step of the method according to the invention comprises the preparation of a mixture of zinc oxide (ZnO), calcium hydroxide ($Ca(OH)_2$) and water ($H_2O$).

Zinc oxide (ZnO) and calcium hydroxide ($Ca(OH)_2$) can come in powder form.

Zinc oxide is added in molar excess in the mixture for step a. Zinc oxide is in particular added in a molar ratio $ZnO/Ca(OH)_2$ included between 2/1 and 10/1, preferably 3/1 and 6/1.

The water ($H_2O$) can be added with a mass ratio $H_2O/(ZnO+Ca(OH)_2)$ included between 1/1 and 1/20 and preferably between 1/5 and 1/10.

Such a quantity of water added to the mixture from the step a) contributes to getting a managed quantity of calcium zincate crystals having the desired sizes. In the case where the water is added at a mass ratio greater than 1/1, it is not possible to get a paste allowing the production of a zinc electrode because the mixture is then too liquid. The kinetics of the reaction is slower and the size of the calcium zincate crystals is more difficult to control. Finally, the zinc electrode obtained from a mixture having too large a quantity of water will comprise fewer calcium zincate crystals.

The preparation of the mixture for the step a) can comprise a first sub-step a.1) of mixing zinc oxide and calcium hydroxide, then a second sub-step a.2) of adding water to the mixture of zinc oxide and calcium hydroxide thus made.

In order to get a homogeneous mixture of solid reagents, the mixture from the sub-step a.1) is formed under stirring for a time included between 1 minute and 10 minutes, preferably between 2 minutes and 7 minutes.

According to the method from the invention, the water added in sub step a.2) can for example be demineralized water, distilled water, water on resin and deionized water, preferably deionized water.

Once the water is added to the preparation of the mixture from step a), the formation of calcium zincate crystals starts.

Step B

The method according to the invention thus implements a second step of ripening of the mixture prepared in step a), so as to form calcium zincate crystals $Ca(OH)_2.2Zn(OH)_2.2H_2O$ according to the reaction from equation 5.

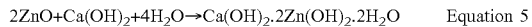

$$2ZnO + Ca(OH)_2 + 4H_2O \rightarrow Ca(OH)_2.2Zn(OH)_2.2H_2O \quad \text{Equation 5}$$

The step b of ripening allows production in situ of calcium zincate crystals of optimal size, in particular for preventing dendritic growth of zinc during charging.

The presence of calcium zincate crystals of controlled size is important for optimizing zincate ion production kinetics and preventing dendrite formation.

Crystals that are too small, in particular having an average size by number less than 10 μm, will have a tendency to be quickly and fully consumed according to the reaction from equation 6 for formation of zincate ions. In this case, the reaction of zinc oxide dissolving into zincate ions according to equation 7, with slower kinetics, does not have time to proceed and the zinc oxide remains inactive. Further, if the calcium zincate crystals are entirely consumed during the charging phase, the nucleation points for the growth thereof during the subsequent discharging step according to the reaction from equation 8 described below will have disappeared. In fact, the reaction from equation 8 is more effectively and more homogeneously seeded in the presence of residual calcium zincate crystals within the electrode.

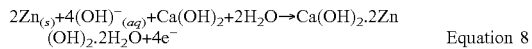

$$2Zn_{(s)} + 4(OH)^-_{(aq)} + Ca(OH)_2 + 2H_2O \rightarrow Ca(OH)_2.2Zn(OH)_2.2H_2O + 4e^- \quad \text{Equation 8}$$

Inversely, if the calcium zincate crystals are too large, in particular having an average size by number over 200 μm, the kinetics of the reaction from equation 6 is slowed. In fact, the low specific surface area (surface/volume ratio) thereof slows the dissolution thereof. In this case, the lower zincate ion concentration in the electrolyte right by the electrode is uncompensated, which again leads to the formation of dendrites.

According to a specific embodiment, the ripening step is driven until getting crystals having an average size by number included between 10 and 200 μm, preferably 20 and 100 μm, preferably 30 and 80 μm and preferably 40 and 60 μm.

The ripening step (step b) can be done under stirring and ambient temperature for a time allowing growth of crystals of preferred size. In particular, the ripening step is done at a temperature included between 20 and 35° C., preferably included between 20 and 25° C. Preferably, the ripening step is driven for a time included between 3 minutes and 20 minutes, preferably between 5 minutes and 10 minutes.

The formation of calcium zincate crystals can be checked throughout the step b of ripening. In particular, the formation of calcium zincate crystals can be seen by an increase the viscosity of the mixture during step b. It is thus possible to monitor the formation of calcium zincate crystals by measuring, for example, the viscosity of the mixture in step b either continuously or by taking several samples at uniform time intervals.

The calcium zincate crystals obtained with the method according to the invention can be characterized, for example, by scanning electron microscope or by energy dispersive analysis, EDS or EDX for "energy dispersive x-ray spectrometry."

Once the calcium zincate crystals have reached the preferred size, step b) of ripening is interrupted by adding a solvent at step c.

Step C

The method according to the invention thus implements a third step of adding solvent to the mixture coming from step b so as to interrupt the ripening by slowing the growth of the calcium zincate crystals $Ca(OH)_2.2Zn(OH)_2.2H_2O$.

The solvent from step c neutralizes the precursors remaining after the ripening reaction from step b. The neutralization of the precursors serves in particular to slow the growth of the calcium zincate crystals in order to allow the production of the electrode. The addition of solvent thus serves to control the formation of calcium zincate crystals, notably in size and number.

The short ripening step following a step of stopping the calcium zincate growth by addition of solvent serves to obtain an optimal mixture of zinc oxide, calcium hydroxide and calcium zincate.

The solvent added in step c can generally be a molecule miscible with water that has a hydroxyl group, meaning an alcohol, and preferably the solvent can be ethanol.

The solvent added in step c is different from water and should not lead to too much reduction of the viscosity of the mixture coming from step b. In particular, the solvent can be added so as to reduce the viscosity of the mixture coming from step b between 1 and 5% and preferably 2 and 3%.

Step D

The method according to the invention finally comprises a step d of production of a zinc electrode by means of the mixture comprising calcium zincate crystals $Ca(OH)_2.2Zn(OH)_2.2H_2O$ obtained from step c.

Other than calcium zincate crystals, the mixture coming from step c also comprises zinc oxide (ZnO) or one of the precursors thereof, water ($H_2O$) and a residual concentration (for example below 5%) of calcium hydroxide ($Ca(OH)_2$) and a solvent. This aqueous mixture, hereafter called "active mass," makes it possible to make a zinc electrode comprising calcium zincate crystals in situ.

Advantageously, the zinc oxide and/or one of the precursors thereof added to the mixture from step a is not fully consumed by the reaction for formation of calcium zincate crystals. It is then possible to produce a zinc electrode directly from the "active mass."

The implementation of the method according to the invention allows a uniform distribution of calcium zincate crystals within the zinc electrode. This controlled distribution serves to avoid the formation of inhomogeneous filler points which enhance zinc deposit and dendrite formation.

In a first sub-step d.1, the active mass can go into a calender in order to smooth it, give it a gloss and make a sheet with a preset thickness.

In a second-sub step d.2, the active mass in sheet form can be pressed through a grate or a foam in order to give it the final shape and geometry thereof. This sub-step d.2 is preferably done in under 4 hours, in particular under 2 hours, and more particularly under 1 hour, in order to avoid hardening of the electrode during shaping thereof.

In a third sub-step d.3, the active mass can next be dried, for example in open air or a drying oven, in order to form a zinc electrode.

The resulting zinc electrode can then be incorporated into an electrochemical battery.

Binder

In order to provide a good cohesion of the zinc electrode obtained by the method as described in this present document, the production method for the zinc electrode can further comprise the addition of a binder in any one of the steps of the method. Preferably, the binder is added to the step b of ripening.

The binder can be selected from vinyl binders, acrylic binders, alkyd and glycerophtalic binders, preferably the binder can be selected from siloxane, epoxide, polyurethane, flaxseed oil, beeswax or polytetrafluoroethylene (PTFE) and preferably the binder is PTFE.

In the case where the binder is added in step b of ripening, the mixture can be stirred for a time of at least 3 minutes, and preferably a time of at least 5 minutes. In this way, the binder is uniformly distributed throughout the mixture.

The binder can be added according to a binder/(water+zinc oxide+calcium hydroxide) mass ratio included between 10 and 90%, and more specifically a mass ratio of 10, 15, 20, 25, 30, 35, 40, 45, 50, 55, 60, 65, 70, 75, 80, 85 or 90% and preferably included between 15 and 25%.

In the case where the binder used is PTFE, it can preferably be added in aqueous suspension form at a concentration included between 40 and 80%, and preferably 60%.

Other Additives

The zinc electrode can also comprise any other additive typically used by the person skilled in the art.

For example, in order to improve the percolation of the mixture, it is also possible to add an additive such as bismuth oxide, mercury oxide, indium hydroxide or an arbitrary electronic conductor, or a mixture thereof at any one of the steps of the zinc electrode production method.

Further, in order to protect the current collector from corrosion, metallic zinc (for example in zinc powder form) can also be added to the electrode.

Preferably, this addition is done in step a or between step c and step d, and preferably in step a of preparation of the mixture.

Zinc Electrode and Zinc-Air Battery

An object of the invention is also a zinc electrode which could be obtained by means of a method such as previously described, and also a zinc-air battery comprising, as negative electrode, at least one zinc electrode.

In particular, the zinc electrode which could be obtained by means of a method such as previously described comprises from 20 to 45% by weight, preferably from 30 to 40% by weight of calcium zincate crystals.

In particular, the zinc-air battery comprises:
a negative terminal;
a positive terminal;
a negative electrode, connected to the negative terminal;
a positive air electrode
where said negative electrode is a zinc electrode such as previously described.

The positive electrode of the battery according to the invention can be an air electrode. An air electrode is a porous solid structure in contact with the liquid electrolyte. The interface between the air electrode and the liquid electrolyte is an interface described as "triple contact" where the active solid material of the electrode, the gaseous oxidizer, meaning the air, and the liquid electrolyte are simultaneously present. A description of the various types of air electrodes for zinc-air batteries is disclosed for example in the bibliographic article by V. Neburchilov et al., "A review on air cathodes for zinc-air fuel cells", *Journal of Power Sources* 195 (2010) p. 1271-1291. Any type of air electrode can be used in the battery according to the present invention. In particular, the first positive air electrode of the battery can be an electrode obtained by an agglomeration of carbon powder made up of high specific surface area carbon grains, such as described in the patent application WO 2000/036677. The carbon particle-based air electrode can further contain at least one oxygen reduction catalyst. Preferably this oxygen reduction catalyst is selected from the group made up of manganese oxide and cobalt oxide.

Beyond the air electrode, the battery according to the invention can comprise a second positive electrode which is an oxygen-releasing electrode. Any type of electrode satisfying this function known to the person skilled in the art can be used in the battery according to the present invention. The second oxygen-releasing positive electrode can for example be a metal electrode stable in the electrolyte of the battery, such as a silver, nickel or stainless-steel electrode.

When it comprises two positive electrodes, the battery according to the invention can comprise at least one switching means with which to connect either the first positive air electrode or else the second positive oxygen-releasing electrode to the positive terminal, and a charging means for the battery which can be connected to the negative electrode and to the second positive air-releasing electrode.

EXAMPLES

A zinc electrode was prepared by means of the method according to the invention.

In the case from the present example, the quantities of reagents presented in Table 1 were used.

TABLE 1

| Reagent | Quantity |
| --- | --- |
| ZnO | 150 g |
| Ca(OH)$_2$ | 30 g |
| Deionized water | 30 mL |
| PTFE | 20 mL |
| Ethanol | 30 mL |

The zinc oxide powder (Merck Emsure) is mechanically mixed with calcium hydroxide (Merck) in a mixer for 5 minutes at 23° C. While keeping the mixer running, deionized water is added to the mixture at constant speed over about 30 seconds, while providing a good homogeneity of the mixture. The addition of water seeds the formation of calcium zincate crystals.

The mixture is held under stirring for 3 minutes. Then, an aqueous suspension of PTFE with a 60% concentration (Aldrich) is added over 1 minute.

The mixture is again kept under stirring for 5 minutes during which the calcium zincate crystals continue to form and grow.

The ripening reaction is interrupted by addition of ethanol over 10 seconds.

The resulting mixture is then passed in a calender, pressed and dried in order to form a zinc electrode in the discharged state.

The invention claimed is:

1. A method for producing a zinc electrode, comprising at least:
    a) preparing a mixture comprising zinc oxide ZnO, calcium hydroxide Ca(OH)$_2$ and water H$_2$O, where a molar ratio defined by ZnO/Ca(OH)$_2$ is between 3/1 and 10/1, and where a mass ratio H$_2$O/(ZnO+Ca(OH)$_2$) is between 1/5 and 1/20,
    b) ripening said mixture, so as to form calcium zincate crystals Ca(OH)$_2$.2Zn(OH)$_2$.2H$_2$O, according to a reaction defined in equation 5

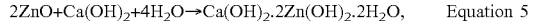
    $$2ZnO+Ca(OH)_2+4H_2O \rightarrow Ca(OH)_2.2Zn(OH)_2.2H_2O, \quad \text{Equation 5}$$

c) adding solvent to the ripened mixture so as to interrupt the ripening by slowing a growth of the calcium zincate crystals Ca(OH)$_2$.2Zn(OH)$_2$.2H$_2$O, and
    d) producing the zinc electrode with said mixture comprising calcium zincate crystals Ca(OH)$_2$.2Zn(OH)$_2$.2H$_2$O,
    wherein the ripening step b) is performed under stirring at a temperature between 20 and 35° C., for a time between 3 minutes and 20 minutes, and
    wherein the method is implemented without ball-milling.

2. The method according to claim 1, wherein the added solvent is an alcohol.

3. The method according to claim 1, wherein said calcium zincate crystals have an average size by number included between 10 and 200 μm.

4. The method according to claim 1, wherein producing the zinc electrode comprises at least:
    passing the mixture comprising the calcium zincate crystals Ca(OH)$_2$.2Zn(OH)$_2$.2H$_2$O in a calender;
    pressing the passed mixture; and
    drying the pressed mixture.

5. The method according to claim 1, wherein a binder is added.

6. The method according to claim 5, wherein the binder is polytetrafluoroethylene.

7. The method according to claim 1, wherein an additive is added and said additive is selected from bismuth oxide, mercury oxide, indium hydroxide or an arbitrary electronic conductor, and a mixture thereof.

8. The method according to claim 1, wherein said molar ratio defined by ZnO/Ca(OH)$_2$ is included between 3/1 and 6/1.

9. A zinc electrode obtained by the method according to claim 1.

10. A zinc-air battery comprising at least one of the zinc electrodes according to claim 9 as a negative electrode.

11. The method according to claim 2, wherein said calcium zincate crystals have an average size by number included between 10 and 200 μm.

12. The method according to claim 5, wherein the binder is added during step b) of ripening.

13. The method according to claim 1, wherein step b) of ripening is driven so as to form the calcium zincate crystals Ca(OH)$_2$.2Zn(OH)$_2$.2H$_2$O having an average size by number included between 10 and 200 μm, and
    wherein step c) of adding the solvent to the ripened mixture is implemented when the calcium zincate crystals have said average size by number included between 10 and 200 μm.

* * * * *